United States Patent
Lim (10) Patent No.: US 10,523,823 B2
(45) Date of Patent: Dec. 31, 2019

(54) DUAL-TONE MULTI-FREQUENCY DIGIT DETECTION IN A WIRELESS COMMUNICATION SYSTEM

(71) Applicant: Intel Corporation, Santa Clara, CA (US)

(72) Inventor: Meoung-Jin Lim, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 244 days.

(21) Appl. No.: 14/743,918

(22) Filed: Jun. 18, 2015

(65) Prior Publication Data

US 2016/0373586 A1    Dec. 22, 2016

(51) Int. Cl.
*H04M 7/12* (2006.01)
*H04W 4/20* (2018.01)

(52) U.S. Cl.
CPC .................... *H04M 7/1295* (2013.01)

(58) Field of Classification Search
None
See application file for complete search history.

(56) References Cited

U.S. PATENT DOCUMENTS

| 6,560,331 B1* | 5/2003 | Cooklev | H04Q 1/4575 379/283 |
|---|---|---|---|
| 6,674,855 B1* | 1/2004 | Karelic | H04M 3/005 379/283 |
| 2002/0076034 A1* | 6/2002 | Prabhu | H04Q 1/46 379/390.02 |

* cited by examiner

*Primary Examiner* — Jason E Mattis
*Assistant Examiner* — Hong Shao
(74) *Attorney, Agent, or Firm* — Schiff Hardin LLP (57) ABSTRACT

In a system for performing dual-tone multi-frequency (DTMF) digit detection, an automatic gain controller receives an incoming frame carrying at least one tone sample and adjusts the energy level of the at least one tone sample responsive to the energy level exceeding a frame energy threshold. A single tone detector determines at least one frequency of the at least one tone sample in the incoming frame. A dual tone detector identifies an energy level of each of the determined frequencies and generates an indication of whether a DTMF digit is present in the incoming frame responsive to a first determined frequency corresponding to a frequency in a first grouping of frequencies and a second determined frequency corresponding to a frequency in a second grouping of frequencies. A DTMF digit determiner for determining a DTMF digit based on the indication.

20 Claims, 9 Drawing Sheets

DUAL-TONE MULTI-FREQUENCY DIGIT DETECTION IN A WIRELESS COMMUNICATION SYSTEM

TECHNICAL FIELD

The present disclosure generally relates to signaling in a telecommunications system and more particularly, to dual-tone multi-frequency (DTMF) digit detection in a wireless communication system.

BACKGROUND

Dual-tone multi-frequency (DTMF) digit detection is used in telecommunication systems for such applications as number dialing and entry of responses in automated response platforms. In a conventional wireless system, a DTMF digit originates at a communication device and undergoes pre-processing before being encoded. The DTMF digit is transmitted wirelessly to a base station that routes the encoded packet containing DTMF information to another communication device, where the received packet is decoded and undergoes post-processing. However, DTMF digits can experience severe degradation during transmission through the speech signal routing path, thereby making it more difficult for applications at the receiving end to differentiate between DTMF digits.

SUMMARY

Briefly described, one embodiment, among others, is a system for performing dual-tone multi-frequency (DTMF) digit detection. The system comprises an automatic gain controller configured for receiving an incoming frame carrying at least one tone sample, the automatic gain controller further configured for adjusting an energy level of the at least one tone sample responsive to the energy level exceeding a frame energy threshold. The system further comprises a single tone detector configured for determining at least one frequency of the at least one tone sample in the incoming frame. The system further comprises a dual tone detector configured for identifying an energy level of each of the determined frequencies and generating an indication of whether a DTMF digit is present in the incoming frame responsive to a first determined frequency corresponding to a frequency in a first grouping of frequencies and a second determined frequency corresponding to a frequency in a second grouping of frequencies. The system further comprises a DTMF digit determiner for determining a DTMF digit based on the indication.

Another embodiment is a method implemented in communication device for performing dual-tone multi-frequency (DTMF) digit detection. The method comprises receiving, by the communication device, an incoming frame carrying at least one tone sample, adjusting an energy level of the at least one tone sample responsive to the energy level exceeding a frame energy threshold, and determining at least one frequency of the at least one tone sample in the incoming frame. The method further comprises identifying an energy level of each of the determined frequencies and generating an indication of whether a DTMF digit is present in the incoming frame responsive to a first determined frequency corresponding to a frequency in a first grouping of frequencies and a second determined frequency corresponding to a frequency in a second grouping of frequencies. The method further comprises determining a DTMF digit based on the indication.

Another embodiment is a system for performing dual-tone multi-frequency (DTMF) digit detection. The system comprises an automatic gain controller configured for receiving an incoming frame carrying at least one tone sample, the automatic gain controller further configured for generating an energy limited at least one tone sample. The system further comprises a single tone detector configured for receiving the energy limited at least one tone sample and for determining frequencies of the two highest energy peaks in the incoming frame. The system further comprises a dual tone detector configured for identifying an energy level of each of the determined frequencies and generating an indication of whether a DTMF digit is present in the incoming frame responsive to a first determined frequency corresponding to a frequency in a first grouping of frequencies and a second determined frequency corresponding to a frequency in a second grouping of frequencies. The system further comprises a DTMF digit determiner for determining a DTMF digit based on the indication.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Various aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Various embodiments are disclosed for implementing robust dual-tone multi-frequency (DTMF) digit detection in the receive path of a communication device. In accordance with exemplary embodiments, a DTMF detector is implemented between the decoder and the post-processor components of the communication device. The DTMF detector detects DTMF digit information and delivers the DTMF digit information to an in-band data application via a message handler or other delivery mechanism, where the in-band data application is executing on the communication device or on a separate computing device.

Figure 1:
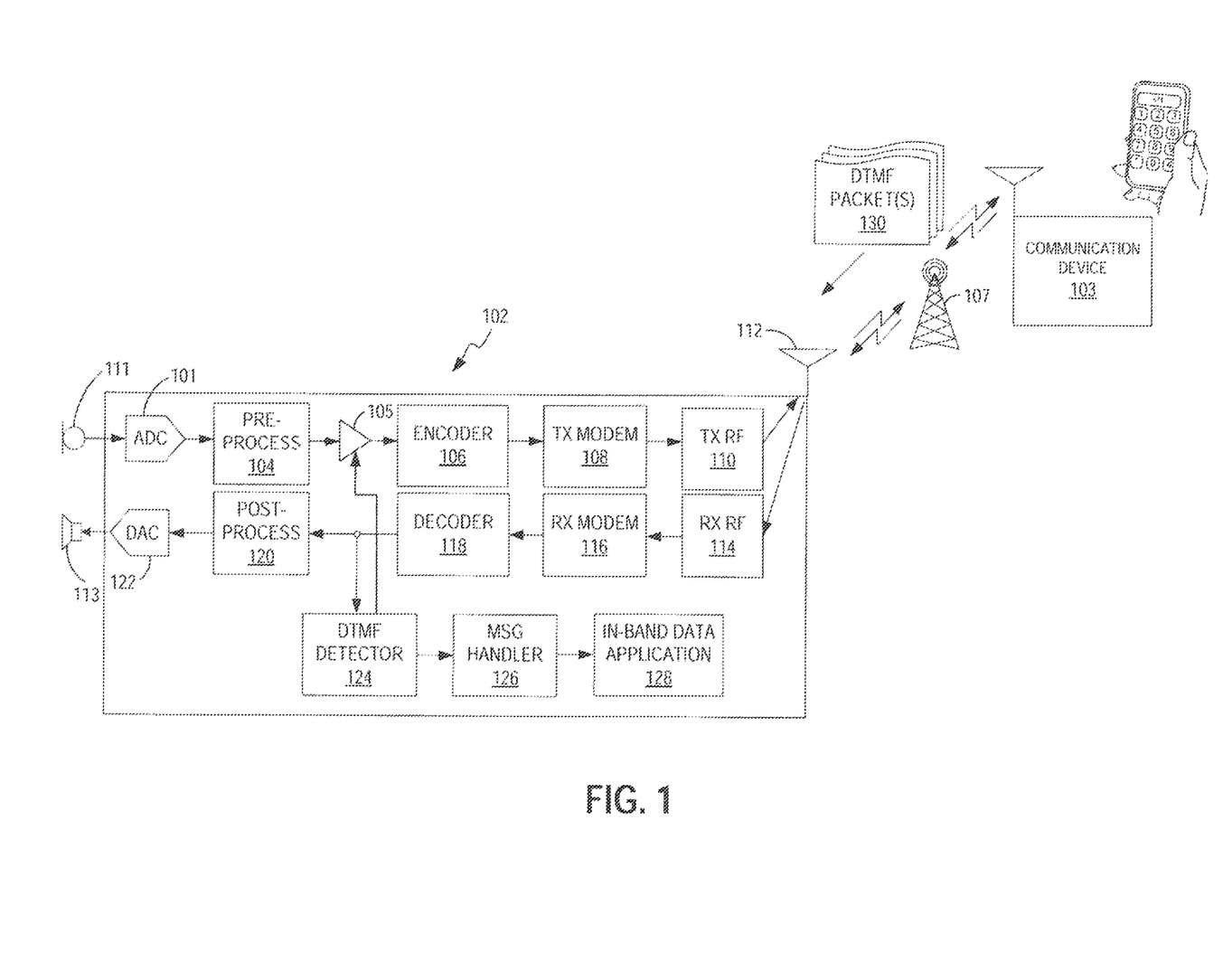
FIG. 1 is a block diagram of a wireless communication environment in which a DTMF detector may be implemented according to various embodiments of the present disclosure.

A description of a system for robust DTMF digit detection is now described followed by a discussion of the operation of the components within the system. FIG. 1 is a block diagram of a wireless communication environment in which a DTMF detector 124 may be implemented in a communication device 102 communicatively coupled to another communication device 103 via a base station 107, where the base station 107 facilitates traffic and signaling between communication devices 102, 103 in a cellular network.

Each communication device 102, 103 may be embodied as a smartphone, tablet, or other computing system, and may include a display and input devices such as a touchscreen interface and/or a keypad. The transmit (TX) path of each communication device 102, 103 comprises a microphone 111, an analog-to-digital converter (ADC) 101, a pre-processing component 104, a gain stage 105, an encoder 106, a transmitter modem 108, and a radio frequency (RF) transmitter 110 coupled to an antenna 112. The receive path (RX) of each communication device 102, 103 comprises an RF receiver 114 coupled to the antenna 112, a receiver modem 116, a decoder 118, a post-processing component 120, a digital-to-analog (DAC) converter 122, and a speaker 113. As these components are generally found in conventional communications devices, further discussion of the same is omitted herein for brevity.

In accordance with exemplary embodiments, each communications device 102, 103 further comprises a DTMF detector 124 inserted between the decoder 118 and the post-processing component 120. The DTMF detector 124 is coupled to a message handler 126, which routes detected DTMF digits to an in-band data application 128. The in-band data application 128 may comprise, for example, an upper layer application that interacts with a user via menu driven key presses for generating DTMF input. As shown, a near end communication device 103 generates one or more DTMF tones via manipulation of a keypad by the user. One or more DTMF packets 130 are transmitted via the base station 107 to the far end communication device 102, where the DTMF detector 124 processes the data stored in the DTMF packet(s) and determines whether DTMF digits are present.

Figure 2:
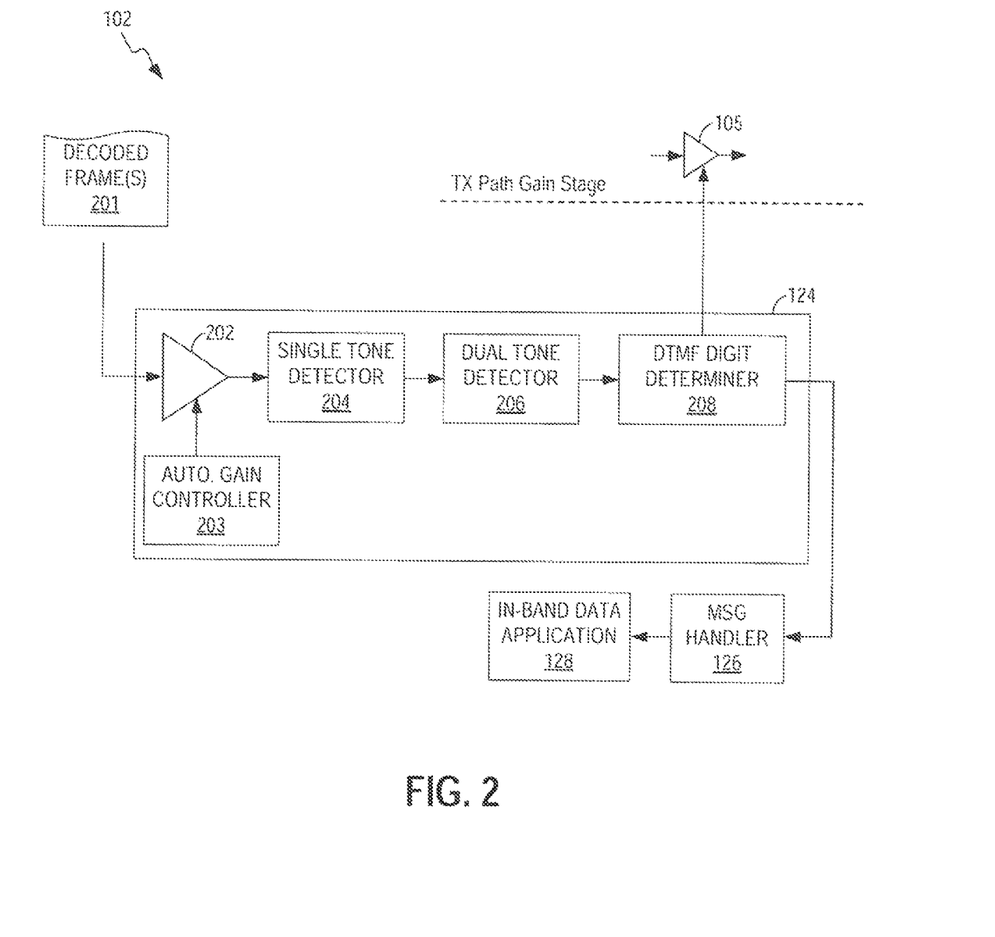
FIG. 2 provides a detailed view of the DTMF decoder in FIG. 1 according to various embodiments of the present disclosure.

Reference is made to FIG. 2, which provides a detailed view of the DTMF decoder 124 in FIG. 1 in accordance with various embodiments. In operation, the DTMF decoder 124 samples frames 201 approximately every 20 ms, where each incoming frame 201 contains 160 bits of PCM (pulse-code modulation) data. The DTMF decoder 124 includes a gain stage that comprises an amplifier 202 and an automatic gain controller 203, where the amplifier 202 is coupled to a single tone detector 204. In operation, the automatic gain controller 203 limits the total energy of input data to avoid saturation in the single tone detector 204. Specifically, the automatic gain controller 203 calculates the total energy of the one or more tone signals contained in each incoming frame 201.

If the total frame energy exceeds a predetermined threshold, the automatic gain controller 203 calculates a down scale gain and adjusts the gain of the amplifier 202 accordingly such that the samples received by the single tone detector 204 are energy limited. The functionality of the automatic gain controller 203 may be implemented in hardware and/or software. When implemented in software, the automatic gain controller 203 may be embodied as a low level driver and/or in a higher application layer.

With DTMF signaling, a combination of two tone frequencies (i.e., a low frequency tone and a high frequency tone) is utilized to convey each digit. A conventional DTMF keypad is arranged in a 4×4 matrix of single tone frequencies where each row represents a low frequency component and each column represents a high frequency component, as set forth in the table below:

TABLE 1

|  | 1,209 Hz | 1,336 Hz | 1,477 Hz | 1,633 Hz |
| --- | --- | --- | --- | --- |
| 697 Hz | 1 | 2 | 3 | A |
| 770 Hz | 4 | 5 | 6 | B |
| 852 Hz | 7 | 8 | 9 | C |
| 941 Hz | * | 0 | # | D |

Each key on a keypad is uniquely identified by its row and column frequency. In operation, the single tone detector 204 samples each incoming frame 201 and calculates the energy level of each of the 8 single tone frequencies. For some embodiments, the single tone detector 204 may be configured to identify the two tones in the incoming frame 201 with the highest energy peaks and determine the tone frequencies associated with these peaks.

The DTMF detector 124 further comprises a dual tone detector 206 configured to determine the row of frequencies that exhibits the highest energy level. Similarly, the DTMF detector 124 determines which column of frequencies exhibits the highest energy level. The DTMF detector 124 further determines whether the row of frequencies with the highest energy level exceeds a row threshold. Similarly, the DTMF detector 124 determines whether the column of frequencies with the highest energy level exceeds a column threshold.

If both the row threshold and the column energy threshold are exceeded, the dual tone detector 206 determines whether the ratio of the highest row energy level to the highest column energy level falls within a predetermined range of target ratios. If the ratio falls within the predetermined range of target ratios, the dual tone detector 206 determines the digit based on the index of the highest row energy level and the index of the highest column energy level. If the row threshold and the column threshold are not exceeded or if the ratio of the highest row energy level to the highest column energy level does not fall within the predetermined range of target ratios, the dual tone detector 206 determines that no DTMF digit is detected (i.e., a non-DTMF event has occurred). The dual tone detector 206 then forwards either an indication of a detected digit or an indication of no DTMF detected to the DTMF digit determiner 208 in the DTMF detector 124.

The dual tone detector 206 operates in conjunction with the DTMF digit determiner 208, where the dual tone detector 206 detects the presence of DTMF digits on a frame-by-frame basis. Specifically, if the dual tone detector 206 detects the presence of a DTMF digit in a current frame 201, the DTMF digit determiner 208 utilizes various counters to track the number of hits for each DTMF digit. Based on the counter values, the DTMF digit determiner 208 makes a final assessment of which DTMF digit, if any, was received by the communication device 102, as described in more detail below.

For some embodiments, the DTMF digit determiner 208 may be further configured to adjust the gain of the gain stage 105 in the TX path of the communication device 102 in response to detection of a DTMF digit being received. Specifically, the DTMF digit determiner 208 may be configured to reduce the gain of the gain stage 105 to avoid the possibility of received DTMF tones being coupled back into the transmit path via the microphone 111 (FIG. 1) when the DTMF tones are being output by the speaker 113 (FIG. 1).

Figure 3:
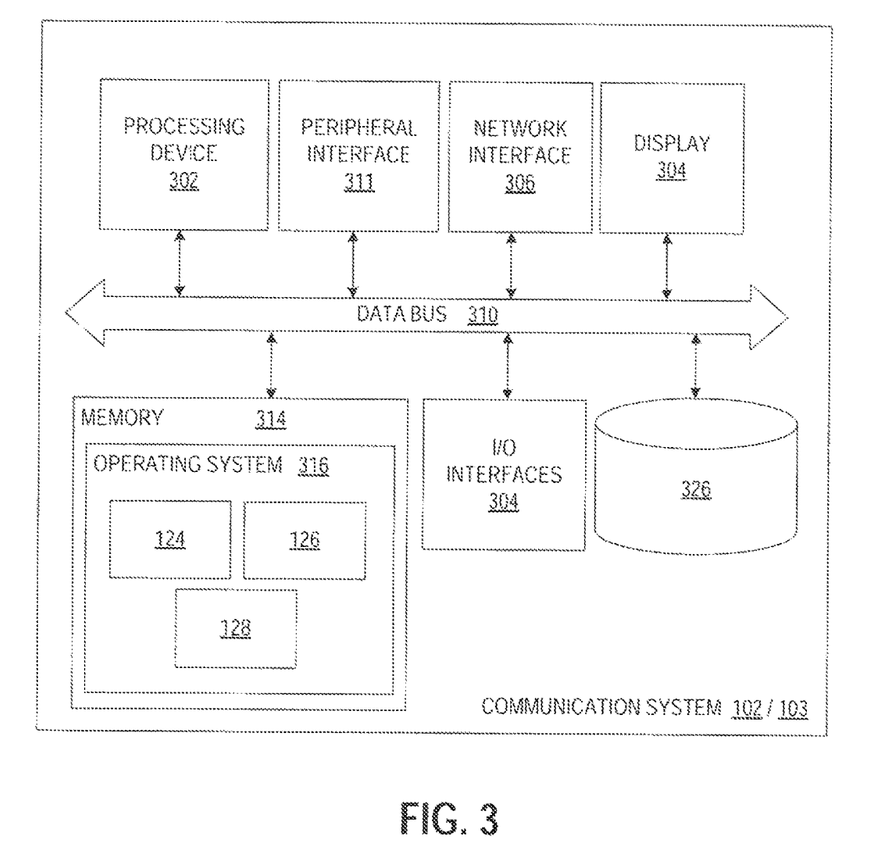
FIG. 3 illustrates an embodiment of the communication devices shown in FIG. 1 according to various embodiments of the present disclosure.

FIG. 3 illustrates an embodiment of the communication devices 102, 103 shown in FIG. 1. The communication devices 102, 103 may be embodied in any one of a wide variety of wireless computing devices, such as a smart phone, tablet, and so forth. As shown in FIG. 3, each of the communication devices 102, 103 comprises memory 314, a processing device 302, one or more input/output interfaces 304, a network interface 306, a display 304, a peripheral interface 311, and mass storage 326, wherein each of these components are connected across a local data bus 310.

The processing device 302 may include any custom made or commercially available processor, a central processing unit (CPU) or an auxiliary processor among several processors associated with the communication devices 102, 103, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 314 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 314 typically comprises a native operating system 316, one or more native applications, emulation systems, or emulated applications for any of a variety of operating systems and/or emulated hardware platforms, emulated operating systems, etc. For example, the applications may include application specific software which may comprise some or all the components 124, 126, 128 of the communication devices 102, 103 depicted in FIG. 1. In accordance with such embodiments, the components 124, 126, 128 are stored in memory 314 and executed by the processing device 302. One of ordinary skill in the art will appreciate that the memory 314 can, and typically will, comprise other components which have been omitted for purposes of brevity.

Input/output interfaces 304 provide any number of interfaces for the input and output of data. The display 304 may comprise a touchscreen or other display device. In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

Figure 4:
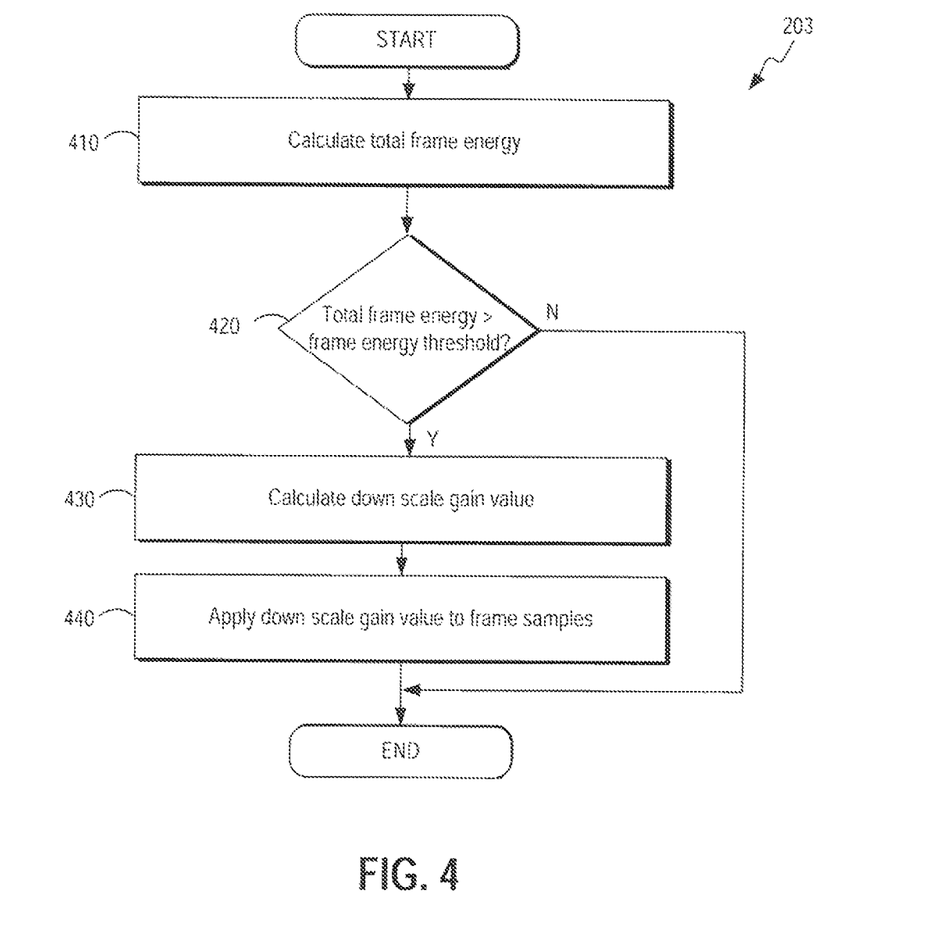
FIG. 4 illustrates an algorithm performed by the automatic gain controller of FIG. 2 for limiting the total energy level for each incoming frame according to various embodiments of the present disclosure.

Reference is made to FIG. 4, which illustrates an algorithm performed by the automatic gain controller 203 for limiting the total energy level for each incoming frame 201 (FIG. 2) in accordance with various embodiments. While the automatic gain controller 203 may be embodied as hardware, the automatic gain controller 203 may alternatively be embodied as computer-implemented functionality where the processing device 302 (FIG. 3) of the communication device 102 (FIG. 2) is programmed to execute the operations described in the flow chart below.

It is understood that the flowchart of FIG. 4 provides merely an example of the many different types of functional arrangements that may be employed to implement the operation of the automatic gain controller 203. As an alternative, the flowchart of FIG. 4 may be viewed as depicting an example of steps of a method implemented in the communication device 102 according to one or more embodiments. Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. It is understood that all such variations are within the scope of the present disclosure.

Beginning with block 410, the automatic gain controller 203 receives an incoming frame 201 and calculates the total energy of one or more tone signals of the incoming frame 201. In decision block 420, if the total frame energy exceeds a frame energy threshold, the automatic gain controller 203 calculates a down scale gain value (block 430) for reducing the total frame energy. In block 440, the automatic gain controller 203 applies the down scale gain value to the incoming frame 201 by configuring the gain of the amplifier 202 (FIG. 2). Referring back to decision block 420, if the total frame energy does not exceed the frame energy threshold, then no adjustment is needed, and the incoming frame 201 is passed to the single tone detector 204 (FIG. 2) for further processing.

Figure 5:
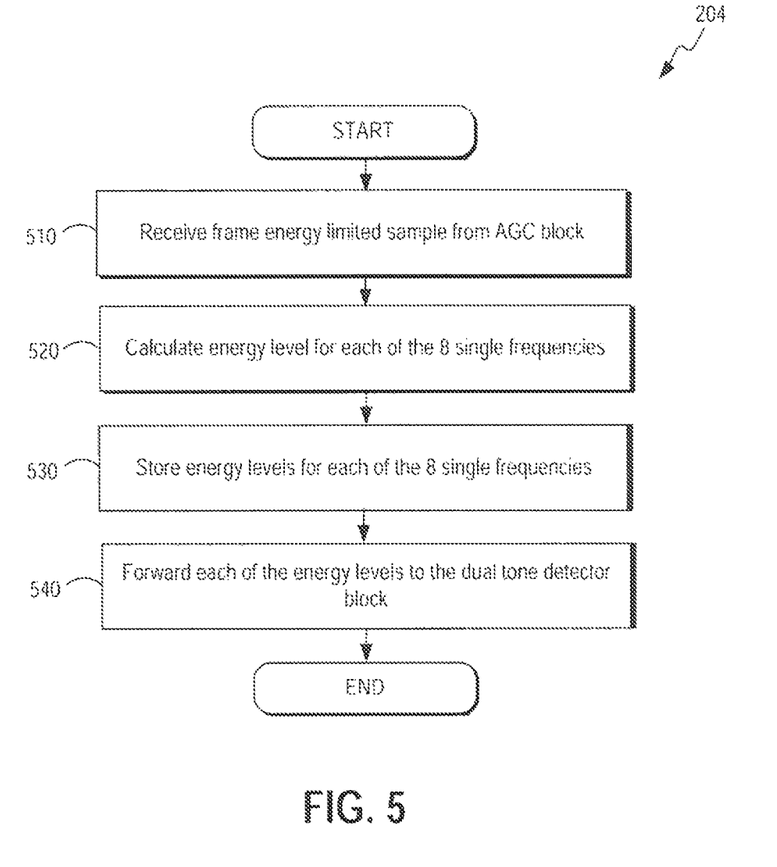
FIG. 5 illustrates an algorithm performed by the single tone detector of FIG. 2 according to various embodiments of the present disclosure.

FIG. 5 illustrates an algorithm performed by the single tone detector 204 in accordance with various embodiments. While the single tone detector 204 may be embodied as hardware, the single tone detector 204 may alternatively be embodied as computer-implemented functionality where the processing device 302 (FIG. 3) of the communication device 102 (FIG. 2) is programmed to execute the operations described in the flow chart below.

It is understood that the flowchart of FIG. 5 provides merely an example of the many different types of functional arrangements that may be employed to implement the operation of the single tone detector 204. As an alternative, the flowchart of FIG. 5 may be viewed as depicting an example of steps of a method implemented in the communication device 102 according to one or more embodiments. Although the flowchart of FIG. 5 shows a specific order of execution, it is understood that the order of execution may differ from that which is depicted. For example, the order of execution of two or more blocks may be scrambled relative to the order shown. Also, two or more blocks shown in succession in FIG. 5 may be executed concurrently or with partial concurrence. It is understood that all such variations are within the scope of the present disclosure.

Beginning with block 510, the single tone detector 204 receives the frame energy limited tone sample from the amplifier 202 (FIG. 2). As discussed above, DTMF tones are composed of combinations of 8 single tone frequencies (697 Hz, 770 Hz, 852 Hz, 941 Hz, 1,209 Hz, 1,336 Hz, 1,447 Hz, and 1,633 Hz), where 697 Hz, 770 Hz, 852 Hz, 941 Hz are associated with a first grouping of frequencies (i.e., low frequency components), while 1,209 Hz, 1,336 Hz, 1,447 Hz, 1,633 Hz are associated with a second grouping of frequencies (i.e., high frequency components).

In block 520, the single tone detector 204 determines whether the frequency of the tone sample of the incoming frame 201 corresponds to one or more of the 8 single tone DTMF frequencies and calculates the energy level for each of the 8 single frequencies. In block 530, the single tone detector 204 records the energy levels for each of the 8 single frequencies and forwards the energy levels to the dual tone detector 206 (block 540).

Figure 6:
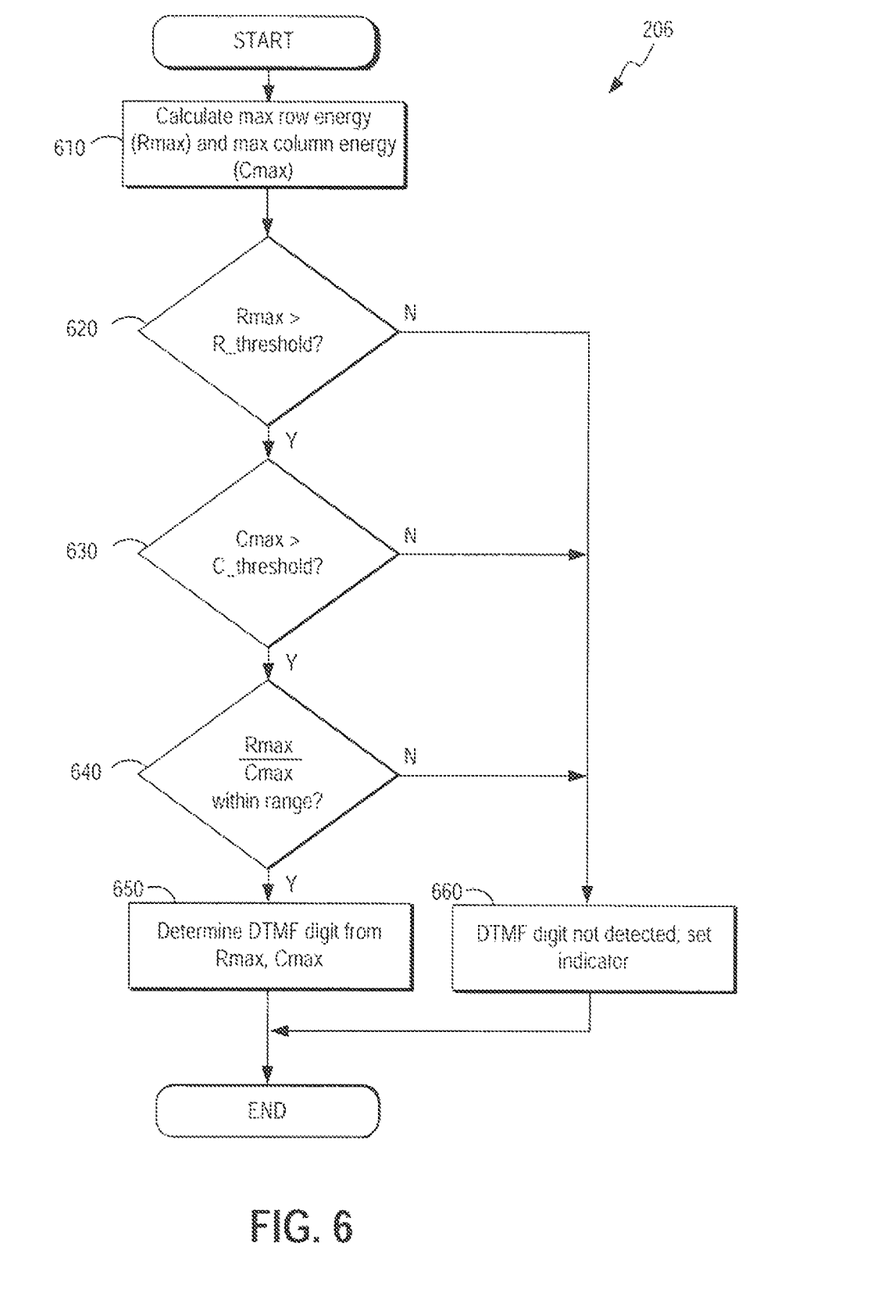
FIG. 6 illustrates an algorithm performed by the dual tone detector of FIG. 2 according to various embodiments of the present disclosure.

Reference is made to FIG. 6, which illustrates an algorithm performed by the dual tone detector 206 in accordance with various embodiments. While the dual tone detector 206 may be embodied as hardware, the dual tone detector 206 may alternatively be embodied as computer-implemented functionality where the processing device 302 (FIG. 3) of the communication device 102 (FIG. 2) is programmed to execute the operations described in the flow chart below.

It is understood that the flowchart of FIG. 6 provides merely an example of the many different types of functional arrangements that may be employed to implement the operation of the dual tone detector 206. As an alternative, the flowchart of FIG. 6 may be viewed as depicting an example of steps of a method implemented in the communication device 102 according to one or more embodiments. Although the flowchart of FIG. 6 shows a specific order of execution, it is understood that the order of execution may differ from that which is depicted. For example, the order of execution of two or more blocks may be scrambled relative to the order shown. Also, two or more blocks shown in succession in FIG. 6 may be executed concurrently or with partial concurrence. It is understood that all such variations are within the scope of the present disclosure.

Beginning with block 610, the dual tone detector 206 determines which row of frequencies has the highest energy level relative to the remaining rows. The dual tone detector 206 similarly determines which column of frequencies has the highest energy level relative to the remaining column. In particular, the dual tone detector 206 determines each of the 16 energy levels in the table below based on the individual energy levels calculated by the single tone detector 204 (FIG. 2) for each of the 8 single DTMF frequencies.

TABLE 2

|  | 1,209 Hz | 1,336 Hz | 1,477 Hz | 1,633 Hz |
| --- | --- | --- | --- | --- |
| 697 Hz | Level 1 | Level 2 | Level 3 | Level 4 |
| 770 Hz | Level 5 | Level 6 | Level 7 | Level 8 |
| 852 Hz | Level 9 | Level 10 | Level 11 | Level 12 |
| 941 Hz | Level 13 | Level 14 | Level 15 | Level 16 |

The energy levels above may be calculated based on a summation of the various frequency combinations or a based on a product of the various frequency combinations. For example, the respective energy levels for 697 Hz and 1,209 Hz may be added together (or multiplied together) to determine energy level 1 in the table above.

Once the energy level table above is populated by the dual tone detector 206, the dual tone detector 206 is able to determine which row of frequencies has the highest energy level relative to the remaining rows based on the corresponding energy levels. For example, the dual tone detector 206 may determine that the second row corresponding to 770 Hz has the highest row energy level based on the sum of the energy levels for that row (i.e., Level 5+Level 6+Level 7+Level 8). The dual tone detector 206 similarly determines which column of frequencies has the highest energy level relative to the remaining column. For example, the dual tone detector 206 may determine that the third column corresponding to 1,477 Hz has the highest column energy level based on the sum of the energy levels for that row (i.e., Level 3+Level 7+Level 11+Level 15).

In decision block 620, the dual tone detector 206 determines whether the highest row energy level exceeds a minimum row energy threshold. Similarly, in decision block 630, the dual tone detector 206 determines whether the highest column energy level exceeds a minimum column energy threshold. In decision block 640, the dual tone detector 206 determines whether the ratio of the highest row energy level to the highest column energy level (Rmax/Cmax) falls within a predetermined range of ratios. Ideally, the ratio of the row energy to the column ratio is 1:1 between the two components. However, it is not uncommon for there to be approximately a 10 dB difference between the frequency peaks. Therefore, the dual tone detector 206 determines whether the ratio of the row and column energy levels falls within an acceptable range. Note that the use of the row and column thresholds as described above as well as the ratio threshold ensures that spurious tones are not erroneously detected as DTMF tones.

If the dual tone detector 206 determines that either the highest row energy level or the highest column energy level does not exceed their respective thresholds, the dual tone detector 206 determines in block 660 that no DTMF digit has been detected, and a corresponding indicator (e.g., DTMF_no_detect) is set. Similarly, if the dual tone detector 206 determines that the ratio of the row and column energy levels does not fall within an acceptable range, the dual tone detector 206 determines in block 660 that no DTMF digit has been detected, and a corresponding indicator (e.g., DTMF_no_detect) is set.

Returning to decision blocks 620, 630, and 640, if the highest row energy level exceeds the row threshold, if the highest column energy level exceeds the column threshold, and if the ratio of the row and column energy levels falls within an acceptable range, then in block 650, the dual tone detector 206 determines the DTMF digit based on the intersection of the row with the highest energy level and the column with the highest energy level (see Table 1). The estimated DTMF digit is then forwarded to the DTMF digit determiner 208 (FIG. 2) for further processing, as described below.

The dual tone detector 206 operates in conjunction with the DTMF digit determiner 208, where the dual tone detector 206 detects the presence of DTMF digits on a frame-by-frame basis. The DTMF digit determiner 208 receives the detection results from the dual tone detector 206 and makes a final determination of which DTMF digit was transmitted from the far end communication device by assessing the detection results from the dual tone detector 206 over multiple frames in order to filter out non-DTMF events.

Figure 7A:
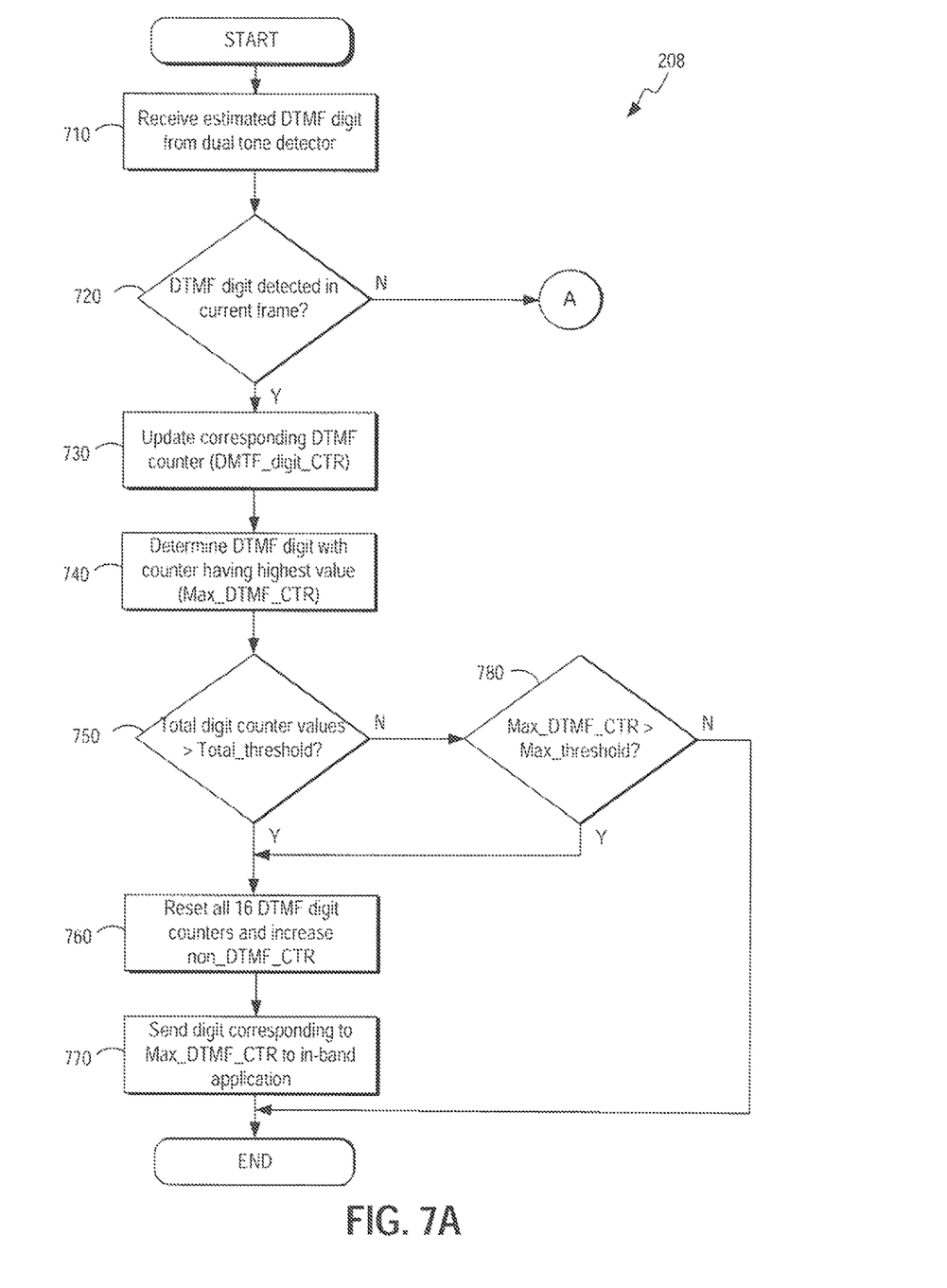
FIGS. 7A and 7B illustrate an algorithm performed by the DTMF digit determiner of FIG. 2 according to various embodiments of the present disclosure.
Figure 7B:
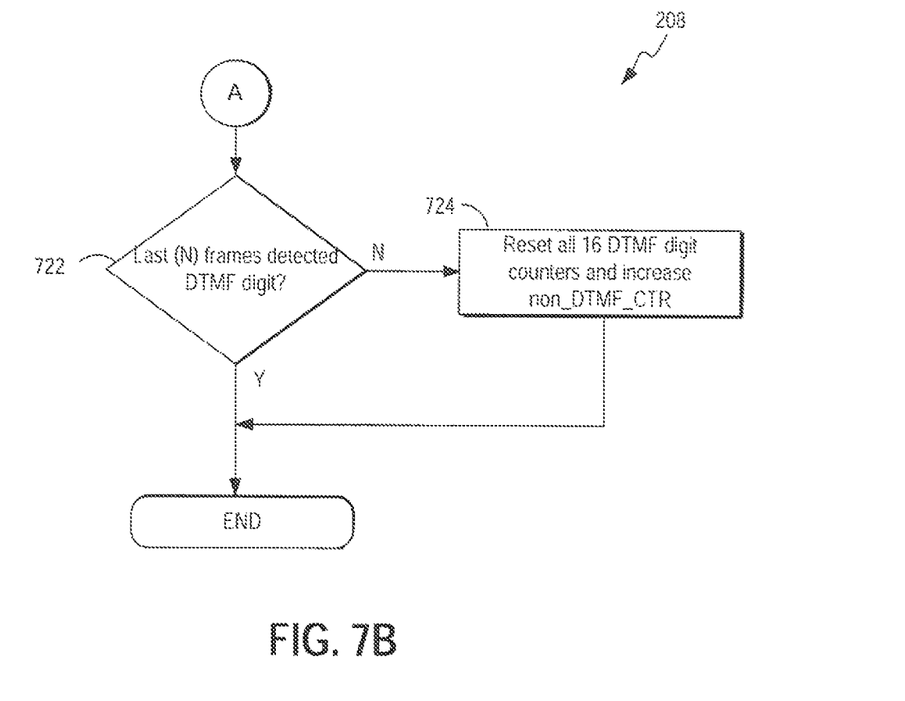

Reference is made to FIGS. 7A and 7B, which illustrate an algorithm performed by the DTMF digit determiner 208 in accordance with various embodiments. While the DTMF digit determiner 208 may be embodied as hardware, the DTMF digit determiner 208 may alternatively be embodied as computer-implemented functionality where the processing device 302 (FIG. 3) of the communication device 102 (FIG. 2) is programmed to execute the operations described in the flow chart below.

It is understood that the flowchart of FIGS. 7A and 7B provide merely an example of the many different types of functional arrangements that may be employed to implement the operation of the DTMF digit determiner 208. As an alternative, the flowchart of FIGS. 7A and 7B may be viewed as depicting an example of steps of a method implemented in the communication device 102 according to one or more embodiments. Although the flowchart of FIGS. 7A and 7B shows a specific order of execution, it is understood that the order of execution may differ from that which is depicted. For example, the order of execution of two or more blocks may be scrambled relative to the order shown. Also, two or more blocks shown in succession in FIGS. 7A and 7B may be executed concurrently or with partial concurrence. It is understood that all such variations are within the scope of the present disclosure.

Beginning with block 710, the DTMF digit determiner 208 receives the estimated DTMF digit from the dual tone detector 206 (FIG. 2). In decision block 720, the DTMF digit determiner 208 determines whether the estimated DTMF digit from the dual tone detector 206 is associated with the current frame 201 (FIG. 2). If the estimated DTMF digit is associated with the current frame 201, then in block 730, the DTMF digit determiner 208 increments a counter associated with the estimated DTMF digit. In this regard, each DTMF digit has a corresponding counter. In block 740, the DTMF digit determiner 208 determines which DTMF digit has the highest counter value.

In decision block 750, the DTMF digit determiner 208 calculates a total value of the counter values corresponding to all the DTMF digits. If the total counter value exceeds a total counter threshold, then in block 760, then the counters for all the DTMF digits are reset. The counter used for tracking non-DTMF events is also reset. In block 770, the DTMF digit with the highest counter value is determined to be the DTMF digit transmitted from the far end. The determined DTMF digit is sent by the DTMF digit determiner 208 to an in-band application for further processing.

Returning back to decision block 720, if the estimated DTMF digit from the dual tone detector 206 is not associated with the current frame 201 (i.e., a non-DTMF event occurred), then flow proceeds to decision block 722 in FIG. 7B where the DTMF digit determiner 208 determines whether a DTMF digit was estimated by the dual tone detector 206 for each of the prior (N) frames. Note that the number of frames (N) is adjustable and is used to ensure that a DTMF digit is reliably detected over a predetermined time interval (e.g., 200 ms) spanning multiple incoming frames 201 (FIG. 2). If a DTMF digit was not estimated by the dual tone detector 206 for each of the prior (N) frames, then in block 724, the DTMF digit determiner 208 resets the counters associated with all the DTMF digits and increments the counter tracking the number of non-DTMF events. That is, the DTMF digit determiner 208 determines that the current frame corresponds to a non-DTMF event (e.g., spurious emission), and flow ends. Returning to decision block 722, if a DTMF digit was estimated for each of the prior (N) frames by the dual tone detector 206, then flow ends where no counters are updated.

Returning back to decision block 750, if the total counter value does not exceed a total counter threshold, then in decision block 780, a determination is made on whether the counter value corresponding to the DTMF digit with the highest counter value exceeds a counter threshold, if the counter value corresponding to the DTMF digit with the highest counter value exceeds the counter threshold, then flow proceeds to blocks 760 and block 770, as described above. Returning to decision block 780, if the counter value corresponding to the DTMF digit with the highest counter value does not exceed the counter threshold, then flow ends. That is, a DTMF digit has not been reliably detected and therefore, no DTMF digit is sent to the in-band application.

Figure 8:
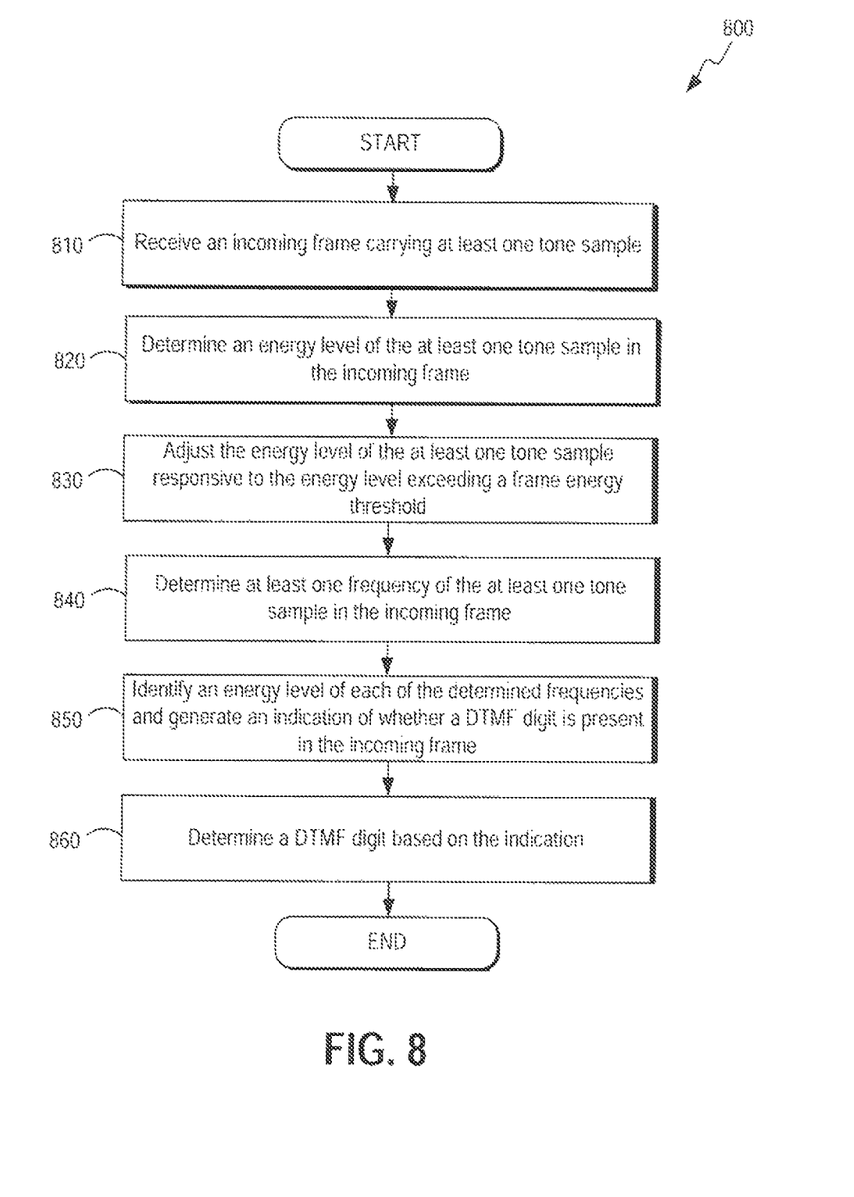
FIG. 8 is a top-level flowchart illustrating examples of functionality implemented as portions of the communication device of FIG. 1 for detecting DTMF digits according to various embodiments of the present disclosure.

Reference is made to FIG. 8, which is a top-level flowchart illustrating examples of functionality implemented as portions of the communication device 102 of FIG. 1 for detecting DTMF digits according to various embodiments of the present disclosure. While the features described below may be embodied as hardware, the features may alternatively be embodied as computer-implemented functionality where the processing device 302 (FIG. 3) of the communication device 102 is programmed to execute the operations described in the flow chart below.

It is understood that the flowchart 800 of FIG. 8 provides merely an example of the many different types of functional arrangements that may be employed to implement DTMF detection in the communication device 102. As an alternative, the flowchart of FIG. 8 may be viewed as depicting an example of steps of a method implemented in the communication device 102 according to one or more embodiments. Although the flowchart 800 of FIG. 8 shows a specific order of execution, it is understood that the order of execution may differ from that which is depicted. For example, the order of execution of two or more blocks may be scrambled relative to the order shown. Also, two or more blocks shown in succession in FIG. 8 may be executed concurrently or with partial concurrence. It is understood that all such variations are within the scope of the present disclosure.

Beginning with block 810, the communication device 102 receives an incoming frame carrying at least one tone sample. In block 820, the communication device 102 determines an energy level of the at least one tone sample in the incoming frame. In block 830, the communication device 102 adjusts the energy level of the at least one tone sample responsive to the energy level exceeding a frame energy threshold. In block 840, the communication device 102 determines at least one frequency of the at least one tone sample in the incoming frame. In block 850, the communication device 102 identifies an energy level of each of the determined frequencies and generate an indication of whether a DTMF digit is present in the incoming frame. For some embodiments, identification of the energy levels and generation of the indication are performed responsive to a first determined frequency corresponding to a frequency in a first grouping of frequencies (i.e., low frequency components) and a second determined frequency corresponding to a frequency in a second grouping of frequencies (i.e., high frequency components). In block 860, the communication device 102 determines a DTMF digit based on the indication.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

The invention claimed is:

1. A system for performing dual-tone multi-frequency (DTMF) digit detection, comprising:
an automatic gain controller configured to receive an incoming frame carrying at least one tone sample, and to adjust an energy level of a tone of the at least one tone sample responsive to an energy level of the incoming frame exceeding a frame energy threshold;
a single tone detector configured to determine at least one frequency of the at least one tone sample in the incoming frame, and to identify an energy level of each of the determined frequencies;

a dual tone detector configured to determine whether a DTMF digit is present in the incoming frame, the DTMF digit corresponding to a first determined frequency in a first grouping of frequencies and a second determined frequency in a second grouping of frequencies, wherein the determination of the DTMF digit being present is made when (i) an energy level of the first determined frequency exceeds a first energy threshold, (ii) an energy level of the second determined frequency exceeds a second energy threshold, and (iii) a ratio of the energy level of the first determined frequency and the energy level of the second determined frequency are within a predetermined ratio range; and a DTMF digit determiner configured to:

increment a counter value when the dual tone detector determines the DTMF digit is present in the incoming frame, and to verify the determination of the DTMF digit when the counter value associated with the DTMF digit is greater than respective counter values associated with other DTMF digits corresponding to frequencies from among the first grouping of frequencies and the second grouping of frequencies other than the first determined frequency and the second determined frequency, and responsive to a total value of respective counter values of DTMF digits including (i) the determined DTMF digit, and (ii) DTMF digits corresponding to frequencies from among the first grouping of frequencies and the second grouping of frequencies other than the first determined frequency and the second determined frequency exceeding a counter threshold, reset the respective counter values of the DTMF digit corresponding to the first grouping of frequencies and the second grouping of frequencies, and reset a counter for tracking non-DTMF events.

2. The system of claim 1, wherein the dual tone detector is further configured to determine that the DTMF digit is not present in the incoming frame when the energy level of the first determined frequency does not exceed the first energy threshold, the energy level of the second determined frequency does not exceed the second energy threshold, or the ratio of the first determined frequency energy level and the second determined frequency energy level does not fall within the predetermined ratio range.

3. The system of claim 1, wherein the DTMF digit determiner is further configured to send the determined DTMF digit to an upper layer application.

4. The method of claim 1, wherein the DTMF digit determiner is configured to, when the DTMF digit is not determined via the dual tone detector, determine whether the DTMF digit was previously detected in a plurality of previous frames; and responsive to the DTMF digit not being previously detected in a plurality of previous frames, reset respective counter values of DTMF digits corresponding to the first grouping of frequencies and the second grouping of frequencies, and increment a counter for tracking non-DTMF events.

5. The method of claim 1, wherein the DTFM digit determiner is configured to send the verified DTMF digit to the upper layer application via a message handler.

6. The system of claim 1, wherein the first grouping of frequencies comprises 697 Hz, 770 Hz, 852 Hz, and 941 Hz, and wherein the second grouping of frequencies comprises 1,209 Hz, 1,336 Hz, 1,477 Hz, and 1,633 Hz.

7. The system of claim 1, wherein the incoming frame is transmitted via a cellular phone.

8. A method implemented in communication device for performing dual-tone multi-frequency (DTMF) digit detection, comprising:

receiving, by the communication device, an incoming frame carrying at least one tone sample;

adjusting an energy level of a tone of the at least one tone sample responsive to an energy level of the incoming frame exceeding a frame energy threshold;

determining at least one frequency of the at least one tone sample in the incoming frame and identifying an energy level of each of the determined frequencies;

determining whether a DTMF digit is present in the incoming frame, the DTMF digit corresponding to a first determined frequency in a first grouping of frequencies and a second determined frequency in a second grouping of frequencies, wherein the determination of the DTMF digit being present is made when (i) an energy level of the first determined frequency exceeds a first energy threshold, an energy level of the second determined frequency exceeds a second energy threshold, and a ratio of the energy level of the first determined frequency and the energy level of the second determined frequency fall within a predetermined ratio range;

incrementing a counter value when the DTMF digit is present in the incoming frame; and verifying the determination of the DTMF digit when the counter value associated with the DTMF digit is greater than respective counter values associated with other DTMF digits corresponding to frequencies from among the first grouping of frequencies and the second grouping of frequencies other than the first determined frequency and the second determined frequency; and responsive to a total value of respective counter values of DTMF digits including (i) the determined DTMF digit, and (ii) DTMF digits corresponding to frequencies from among the first grouping of frequencies and the second grouping of frequencies other than the first determined frequency and the second determined frequency exceeding a counter threshold, resetting the respective counter values of the DTMF digits corresponding to the first grouping of frequencies and the second grouping of frequencies, and resetting a counter for tracking non-DTMF events.

9. The method of claim 8, further comprising:

determining that the DTMF digit is not present in the incoming frame when the energy level of the first determined frequency does not exceed the first energy threshold, the energy level of the second determined frequency does not exceed the second energy threshold, or the ratio of the first determined frequency energy level and the second determined frequency energy level do not fall within the predetermined ratio range.

10. The method of claim 8, wherein the first grouping of frequencies comprises 697 Hz, 770 Hz, 852 Hz, and 941 Hz, and wherein the second grouping of frequencies comprises 1,209 Hz, 1,336 Hz, 1,477 Hz, and 1,633 Hz.

11. The method of claim 8, wherein the communication device comprises a cellular phone, and wherein the incoming frame is transmitted via another cellular phone.

12. The method of claim 8, further comprising:
sending the determined DTMF digit to an upper layer application.

13. The method of claim 12, wherein,
when the DTMF digit is not determined to be present in the incoming frame, determining whether the DTMF digit was previously detected in a plurality of previous frames; and
responsive to the DTMF digit not being previously detected in a plurality of previous frames, resetting respective counter values of the DTMF digits corresponding to the first grouping of frequencies and the second grouping of frequencies, and incrementing a counter for tracking non-DTMF events.

14. A system for performing dual-tone multi-frequency (DTMF) digit detection, comprising:
an automatic gain controller configured to receive an incoming frame carrying at least one tone sample, and to generate an energy limited at least one tone sample by adjusting an energy level of a tone of the at least one tone sample when an energy level of the incoming frame exceeds a frame energy threshold;
a single tone detector configured to receive the energy limited at least one tone sample, determine frequencies of the two highest energy peaks in the incoming frame, and identify an energy level of each of the determined frequencies;
a dual tone detector configured to determine whether a DTMF digit is present in the incoming frame, the DTMF digit corresponding to a first determined frequency in a first grouping of frequencies and a second determined frequency in a second grouping of frequencies,
wherein the determination of the DTMF digit being present is made when (i) an energy level of the first determined frequency exceeds a first energy threshold, (ii) an energy level of the second determined frequency exceeds a second energy threshold, and (iii) a ratio of the energy level of the first determined frequency and the energy level of the second determined frequency falls within a predetermined ratio range; and
a DTMF digit determiner configured to increment a counter value when the dual tone detector determines that the DTMF digit is present in the incoming frame, and to verify the determination of the DTMF digit when the counter value associated with the DTMF digit is greater than respective counter values associated with other DTMF digits corresponding to frequencies from among the first grouping of frequencies and the second grouping of frequencies other than the first determined frequency and the second determined frequency; and
responsive to a total value of respective counter values of DTMF digits including (i) the determined DTMF digit, and (ii) DTMF digits corresponding to frequencies from among the first grouping of frequencies and the second grouping of frequencies other than the first determined frequency and the second determined frequency exceeding a counter threshold, reset the respective counter values of the DTMF digit corresponding to the first grouping of frequencies and the second grouping of frequencies, and reset a counter for tracking non-DTMF events.

15. The system of claim 14, wherein the first grouping of frequencies comprises 697 Hz, 770 Hz, 852 Hz, and 941 Hz, and
wherein the second grouping of frequencies comprises 1,209 Hz, 1,336 Hz, 1,477 Hz, and 1,633 Hz.

16. The system of claim 3, wherein non-DTMF events are caused by a spurious emission.

17. The system of claim 1, wherein the DTMF digit determiner is further configured to determine a total value of respective counter values of DTMF digits including (i) the determined DTMF digit, and (ii) DTMF digits corresponding to frequencies from among the first grouping of frequencies and the second grouping of frequencies other than the first determined frequency and the second determined frequency.

18. The system of claim 17, wherein the DTMF digit determiner is further configured to reset the respective counter values of the DTMF digit corresponding to the first grouping of frequencies and the second grouping of frequencies when the total value of respective counter values of DTMF digits exceeds the total threshold value.

19. The system of claim 17, wherein the DTMF digit determiner is further configured to reset the respective counter values of the DTMF digit corresponding to the first grouping of frequencies and the second grouping of frequencies when (i) the total value of respective counter values of DTMF digits do not exceed the total threshold value, and (ii) a counter value corresponding to the DTMF digit with the highest counter value exceeds a maximum counter threshold value.

20. The system of claim 19, wherein the total threshold value and the maximum counter threshold value are different than one another.

* * * * *